: US010257328B2

United States Patent
Chu et al.

(10) Patent No.: US 10,257,328 B2
(45) Date of Patent: Apr. 9, 2019

(54) METHOD AND APPARATUS FOR CONTROL FRAME EXTENSION

(71) Applicant: Marvell International Ltd., Hamilton (BM)

(72) Inventors: Liwen Chu, San Ramon, CA (US);
Sagar A. Tamhane, Fremont, CA (US);
Hongyuan Zhang, Fremont, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/691,398

(22) Filed: Aug. 30, 2017

(65) Prior Publication Data

US 2018/0063297 A1 Mar. 1, 2018

Related U.S. Application Data

(60) Provisional application No. 62/381,414, filed on Aug. 30, 2016.

(51) Int. Cl.
*H04L 29/06* (2006.01)
*H04W 84/12* (2009.01)

(52) U.S. Cl.
CPC .............. *H04L 69/22* (2013.01); *H04L 69/06* (2013.01); *H04W 84/12* (2013.01)

(58) Field of Classification Search
CPC ......... H04L 69/22; H04L 69/06; H04W 84/12
See application file for complete search history.

(56) References Cited

U.S. PATENT DOCUMENTS

| 9,240,974 | B2 * | 1/2016 | Bao ........................... H04L 1/18 |
| 2013/0128809 | A1 * | 5/2013 | Wentink .............. H04L 29/0604 370/328 |
| 2014/0198805 | A1 * | 7/2014 | Qi ......................... H04B 7/2656 370/474 |
| 2016/0150058 | A1 * | 5/2016 | Wentink .................. H04L 69/22 370/474 |
| 2016/0192363 | A1 * | 6/2016 | Kasher ...................... H04L 5/00 370/329 |
| 2016/0262051 | A1 * | 9/2016 | Merlin .................. H04L 5/0057 |
| 2016/0338123 | A1 * | 11/2016 | Yang ...................... H04W 48/18 |
| 2017/0230149 | A1 * | 8/2017 | Wang ................... H04L 1/1819 |
| 2017/0230811 | A1 * | 8/2017 | Wentink ................ H04W 8/005 |

* cited by examiner

*Primary Examiner* — Lan-Huong Truong

(57) ABSTRACT

Aspects of the disclosure provide an apparatus having a processing circuit and a transceiver. The processing circuit is configured to generate a frame to have an extended subtype under a control type, configure a media access control (MAC) header of the frame to indicate an extended control frame format, and configure a field of the frame to be an extended subtype field according to the extended control frame format to carry an identification for the extended subtype. The extended subtype is defined in addition to a plurality of subtypes that are identifiable using a subtype field in the frame according to a control frame format. The transceiver is configured to transmit signals to carry the frame.

17 Claims, 6 Drawing Sheets

METHOD AND APPARATUS FOR CONTROL FRAME EXTENSION

INCORPORATION BY REFERENCE

This present disclosure claims the benefit of U.S. Provisional Application No. 62/381,414, "CONTROL FRAME EXTENSION" filed on Aug. 30, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus having a processing circuit and a transceiver. The processing circuit is configured to generate a frame to have an extended subtype under a control type, configure a media access control (MAC) header of the frame to indicate an extended control frame format, and configure a field of the frame to be an extended subtype field according to the extended control frame format to carry an identification for the extended subtype. The extended subtype is defined in addition to a plurality of subtypes that are identifiable using a subtype field in the frame according to a control frame format. The transceiver is configured to transmit signals to carry the frame.

According to an aspect of the disclosure, the processing circuit is configured to fill in the subtype field in the frame with a value that is predefined to indicate the extended control frame format. In an embodiment, the processing circuit is configured to configure a field outside of the MAC header to be the extended subtype field.

According to another aspect of the disclosure, the processing circuit is configured to fill in a type field in the MAC header of the frame with a specific value that is predefined to indicate the control type, and the extended control frame format. In an embodiment, the processing circuit is configured to configure the subtype field to be the extended subtype field based on the type field. In another embodiment, the processing circuit is configured to configure a field other than the subtype field in the MAC header to be the extended subtype field.

Aspects of the disclosure provide a method for wireless communication. The method includes generating a frame to have an extended subtype under a control type. The extended subtype is defined in addition to a plurality of subtypes that are identifiable using a subtype field in the frame according to a control frame format. The method further includes configuring a media access control (MAC) header of the frame to indicate an extended control frame format, configuring a field of the frame to be an extended subtype field according to the extended control frame format to carry an identification for the extended subtype and transmitting, by a transmitting circuit, signals to carry the frame.

Aspects of the disclosure provide an apparatus including a transceiver and a processing circuit. The transceiver is configured to receive wireless signals, and generate a frame in response to the wireless signals. The processing circuit is configured to parse the frame, detect the frame having an extended control frame format based on a media access control (MAC) header of the frame, and extract an identification for an extended subtype from an extended subtype field according to the extended control frame format. The extended subtype is defined in addition to a plurality of subtypes that are identifiable using a subtype field according to a control frame format.

Aspects of the disclosure provide a method of wireless communication. The method includes generating a frame in response to received wireless signals, detecting the frame having an extended control frame format based on a media access control (MAC) header of the frame and extracting an identification for an extended subtype from an extended subtype field according to the extended control frame format. The extended subtype is defined in addition to a plurality of subtypes that are identifiable using a subtype field according to a control frame format.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
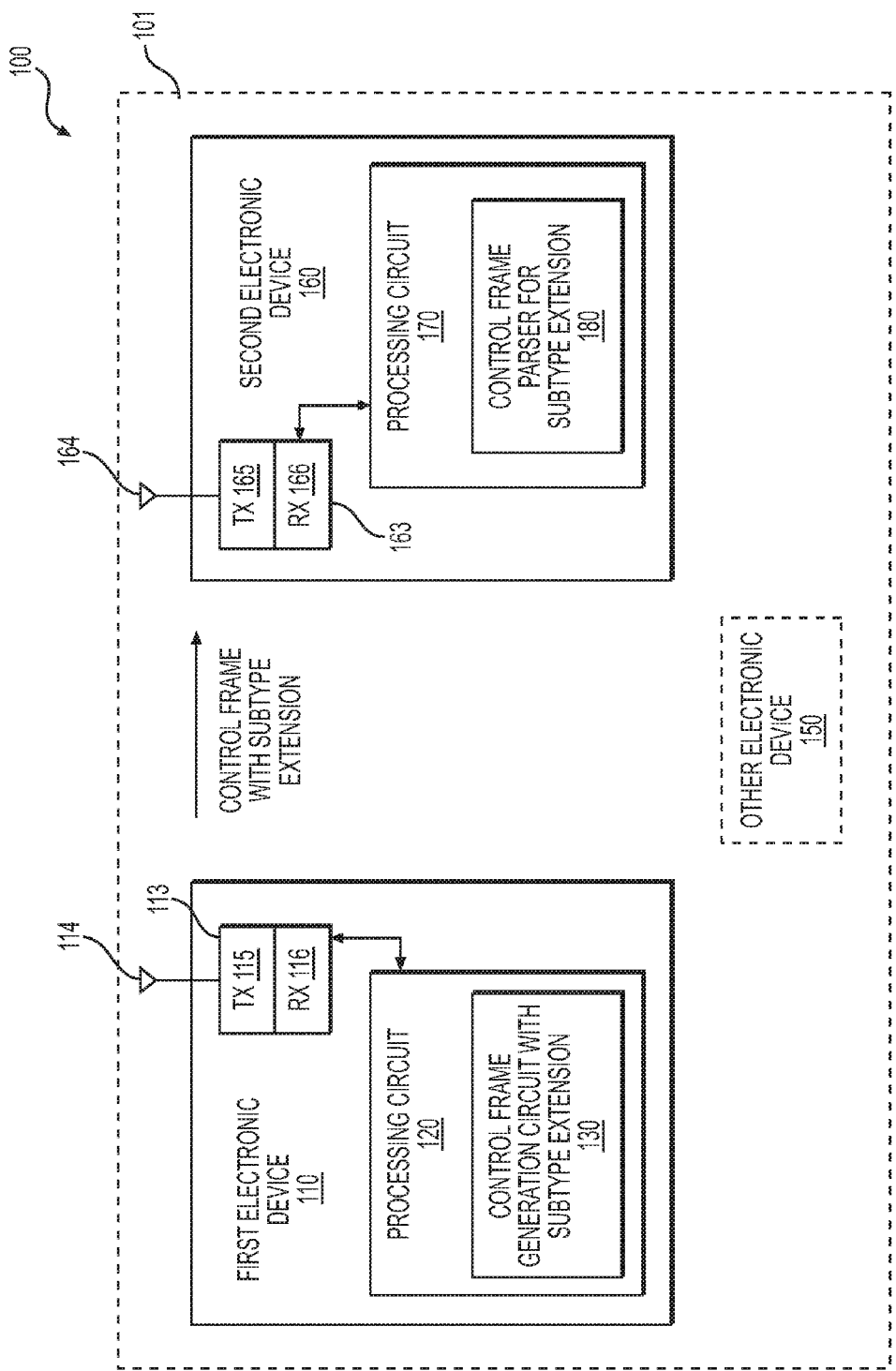
FIG. 1 shows a block diagram of a network system 100 according to an embodiment of the disclosure.

FIG. 1 shows a block diagram of a network system 100 according to an embodiment of the disclosure. The network system 100 includes a plurality of electronic devices, such as a first electronic device 110, a second electronic device 160, and the like, in wireless communication. According to an aspect of the disclosure, the electronic devices are configured to transmit/receive control frames in an extended control frame format. Specifically, a control frame in the extended control frame format includes an indictor in a media access control (MAC) header of the control frame to indicate the extended control frame format, and includes an extended subtype field according to the extended control frame format to carry an identification for an extended subtype. In an example, the extended subtype is defined in frame payload in addition to a plurality of subtypes that are identifiable using a subtype field in a control frame format.

The network system 100 includes interconnections that are implemented using any suitable network technology, such wired, wireless, a local area network (LAN), a wireless LAN (WLAN), a cellular network, a fiber optical network, a wide area network (WAN), a peer-to-peer network, the Internet, and the like. In an example, the plurality of electronic devices are in a basic service set (BSS) 101 that is implemented using WLAN technology to interconnect, for example, the first electronic device 110 with the second electronic device 160. In an example, the network system 100 includes other suitable interconnections (not shown), such as a a fiber optical network, and the like to provide connections for the BSS 101 to be connected to for example Internet.

It is noted that, in another example, the plurality of electronic devices use other suitable wireless technology, such as cellular network technology for communication.

In an embodiment, the BSS 101 is an infrastructure type basic service set. In an example, the electronic devices include one or more access point (AP) devices and one or more station (STA) devices. AP devices include network hardware and software configured to serve as a bridge to allow wireless compliant devices, such as the STA devices to connect to other part of the network system 100. In an example, the first electronic device 110 is an AP device, and the second electronic device 160 is an STA device. In another example, the second electronic device 160 is an AP device, and the first electronic device 110 is an STA device.

In another embodiment, both the first electronic device 110 and the second electronic device 160 are STA devices. In an example, one of the electronic devices, such as the first electronic device 110, is a relay device and forwards the received information from the second electronic device 160 to another device, via wired and/or wireless connection. In another example, one of the electronic devices, such as the first electronic device 110, is a central controller configured to generate control signals, and provide the control signals, via wireless connection, to other devices, such as the second electronic device 160.

The first electronic device 110 and the second electronic device 160 can be any suitable device, such as a desktop computer, a laptop computer, a tablet computer, a smart phone, a personal digital assistant (PDA), a smart watch, a smart camera, a smart TV, a smart voice recorder, a wearable device, a sensor device, an actuator device, a plug-in device for a home appliance, a home appliance, a locker, a light bulb, a power switch, and the like.

The electronic devices in the network system 100 transmit and receive datagrams as various types of frames, such as control frames, management frames, data frames and the like. The control frames are used to facilitate the exchange of data frames in a network system, such as the network system 100. The network system 100 uses various subtypes of control frames, such as acknowledgement (ACK) frame, request to send frame (RTS) frame, clear to send (CTS) frame, block ACK frame, block ACK request frame, and the like. In an example, a control frame includes an indicator to indicate the control type, and includes an indicator to indicate a subtype for the control frame. For example, a frame includes a media access control (MAC) header having a type field and a subtype field. The type field carries a value corresponding to the type of the frame, and the subtype carries a value corresponding to the subtype of the frame. In an example, the type field includes two binary bits to indicate the type of the frame, and the subtype field includes four binary bits to indicate the subtype. For example, when the type field has a binary value "01", the frame is a control frame. When the type field has the binary value "01", and the subtype field has a binary value "1101", the frame is an ACK frame.

According to an aspect of the disclosure, the network system 100 uses control frames in an extended control frame format to support more subtypes for control frames. In an example, the subtype field in a regular control format includes a fixed number of bits, such as four bits, thus the regular control format supports a limited number of subtypes, such as a maximum of sixteen. The extended control frame format is used to support extended number of subtypes, such as over sixteen subtypes of control frames. For example, the subtype field in the regular control format is used to identify for example fifteen or less then fifteen subtypes of control frames. When additional subtypes (also referred to as extended subtypes) of control frames are defined in a wireless communication standard (e.g., a version of 802.11 standard), and are used in the network system 100, the extended control frame format is used for the additional subtypes.

In an embodiment, according to the extended control frame format, a specific value in the subtype field is used to indicate the extended control frame format. Further, a field outside of the MAC header, such as a field in the payload and the like, is used as an extended subtype field to indicate the subtype. The extended subtype field can include any suitable number of bits. Thus, the extended control frame format can support additional subtypes.

In another embodiment, according to the extended control frame format, a specific value in the type field that is different from the value corresponding to the control type is used to indicate the extended control frame format. Then, a field in the MAC header is re-configured to be the extended subtype field under the extended control frame format. The field can be the subtype field in the regular control frame format, or can be a field other than the subtype field. In an example, when the type field has a binary value "01", the frame is a control frame with regular control frame format, and when the type field has a binary value "11", the frame is a control frame with the extended control frame format.

In the FIG. 1 example, the first electronic device 110 is configured to generate a control frame of an extended subtype in the extended control frame format, and transmit wireless signals to carry the generated control frame. The second electronic device 160 is configured to receive the wireless signals that carry the control frame, parse the control frame to detect the extended control frame format, and extract the extended subtype and the control information from the control frame according to the extended control frame format.

Specifically, in the FIG. 1 example, the first electronic device 110 includes a transceiver circuit 113 and a processing circuit 120 coupled together as shown in FIG. 1. In the example, the transceiver circuit 113 includes a receiving circuit (RX) 116 and a transmitting circuit (TX) 115 that are both coupled to an antenna 114. The processing circuit 120 includes a control frame generation circuit 130 configured to generate control frames in various formats, such as the regular control frame format, the extended control frame format, and the like.

The transceiver circuit 113 is configured to receive and transmit wireless signals. For example, the receiving circuit 116 is configured to generate electrical signals in response to captured electromagnetic waves by the antenna 114, and process the electrical signals to extract digital streams from the electrical signals. In an example, the transmitting circuit 115 is configured to receive digital streams, such as control frames, management frames, data frames, and the like from for example the processing circuit 120, generate radio frequency (RE) signals to carry the digital streams, and emit electromagnetic waves in the air via the antenna 114 to transmit wireless signals that carry the digital streams.

According to an aspect of the disclosure, the control frame generation circuit 130 is configured to generate the various control frames to facilitate in the exchange of data frames. In an example, the control frame generation circuit 130 is configured to generate a control frame of an extended subtype, and to use the extended control frame format for the generation of the control frame. In an embodiment, the control frame generation circuit 130 fills in the type field with binary value "01" to indicate the control type, and fills in the binary value "0001" in the subtype field within the MAC header of the control frame to indicate the extended control frame format. Further, in the embodiment, the control frame generation circuit 130 includes an extended subtype field in the payload of the control frame, and fills a value corresponding to the extended subtype of the control frame in the extended subtype field.

According to an aspect of the disclosure, in the above embodiment, the control frame generation circuit 130 fills in other fields in the MAC header in the similarly manner as the regular control frame format, thus legacy devices that overhead the control frame can process the control frame accordingly. In an example, a control frame in the regular control frame format has binary value "0000" at bits B8-B11 in the frame control field in the MAC header. The control frame generation circuit 130 also fills in the binary value "0000" at bits B8-B11 in the frame control field in the MAC header of the control frame in the extended control frame format.

In another embodiment, the control frame generation circuit 130 fills in the type field with binary value "11" that is specifically defined to indicate the extended control frame format that uses a re-configured field in the MAC header as the extended subtype field. Further, in the embodiment, the control frame generation circuit 130 fills in a value corresponding to the extended subtype field in the re-configured field. In an example, the re-configured field under the extended control frame format is the subtype field under the regular control frame format. In another example, the re-configured field under the extended control frame format is not the same as the subtype field under the regular control frame format.

The control frame generation circuit 130 also fills in other fields of the control frame, such as a receiver address field, a transmitter address field, a duration field, the payload, a frame check sequence field and the like.

In the FIG. 1 example, the second electronic device 160 includes a transceiver circuit 163 and a processing circuit 170 coupled together. The transceiver circuit 163 includes a transmitting circuit 165 and a receiving circuit 166 that are both coupled to an antenna 164. The processing circuit 170 includes a control frame parser 180 configured to parse control frames in various formats, such as the regular control frame format, the extended control frame format, and the like.

The transceiver circuit 163 is configured to receive and transmit wireless signals. For example, the receiving circuit 166 is configured to generate electrical signals in response to captured electromagnetic waves by the antenna 164, process the electrical signals to extract digital streams (e.g., frames) from the electrical signals and provide the digital streams to the processing circuit 170. In an example, the transmitting circuit 165 is configured to receive digital streams, such as control frames, management frames, data frames, and the like from for example the processing circuit 170, generate radio frequency (RF) signals to carry the digital streams, and emit electromagnetic waves in the air via the antenna 164 to transmit wireless signals that carry the digital streams.

The processing circuit 170 is configured to process received digital streams, and generate digital streams for transmission. For example, the control frame parser 180 is configured to detect that a received frame is a control frame in an extended control frame format, and parse the control frame according to the extended control frame format to extract the subtype (e.g., extended subtype) of the control frame and the control information associated with the subtype.

In an embodiment, the control frame parser 180 detects that the type field in the MAC header has binary value "01", and the subtype field in the MAC header has binary value "0001". Based on the type field and the subtype field, the control frame parser 180 determines that the frame is a control frame in an extended control frame format that uses a specific field outside of the MAC header as the extended subtype field. The control frame parser 180 extracts the value in the extended subtype field according to the extended control frame format to determine the extended subtype.

In another embodiment, the control frame parser 180 detects that the type field in the MAC header has binary value "11". Based on the type field, the control frame parser 180 determines that the frame is a control frame in an extended control frame format that uses a re-configured field in the MAC header as the extended subtype field. The control frame parser 180 extracts the value in the reconfigured field according to the extended control frame format to determine the extended subtype.

It is noted that the control frame parser 180 can also parse other fields of the control frame, such as a receiver address field, a transmitter address field, a duration field, the payload, a frame check sequence field and the like. The control frame parser 180 can determine whether the control frame is for the second electronic device 160, and then operate accordingly.

According to an aspect of the disclosure, the BSS 101 uses 2.4 GHz/5 GHz band, and the BSS 101 includes other electronic device 150. In an example, the electronic device 150 is a legacy device that does not support the extended control frame format. However, when the electronic device 150 receives a control frame sent between the first electronic device 110 and the second electronic device 160. When the bits B8-B11 in the frame control field in the MAC header of the control frame has binary value "0000", the electronic device 150 will not discard the received frame and can set network allocation vector (NAV) according to a value in the duration field of the control frame before discard the control frame.

In a related example, the bits B8-B11 in the frame control field in the MAC header of a control frame are used for identifying an extended subtype, and thus do not have binary value "0000", In the related example, the electronic device 150 discards the control frame without setting NAV accordingly.

According to an aspect of the disclosure, the control frame generation circuit 130 and the control frame parser 180 are implemented in a MAC layer that is the lower sublayer of the data link layer (layer 2) of an OSI model.

It is also noted that, in an example, the processing circuit 120 includes a control frame parser (not shown) that is similarly configured as the control frame parser 180, and the processing circuit 170 includes a control frame generation circuit (not shown) that is similarly configured as the control frame generation circuit 130.

Figure 2:
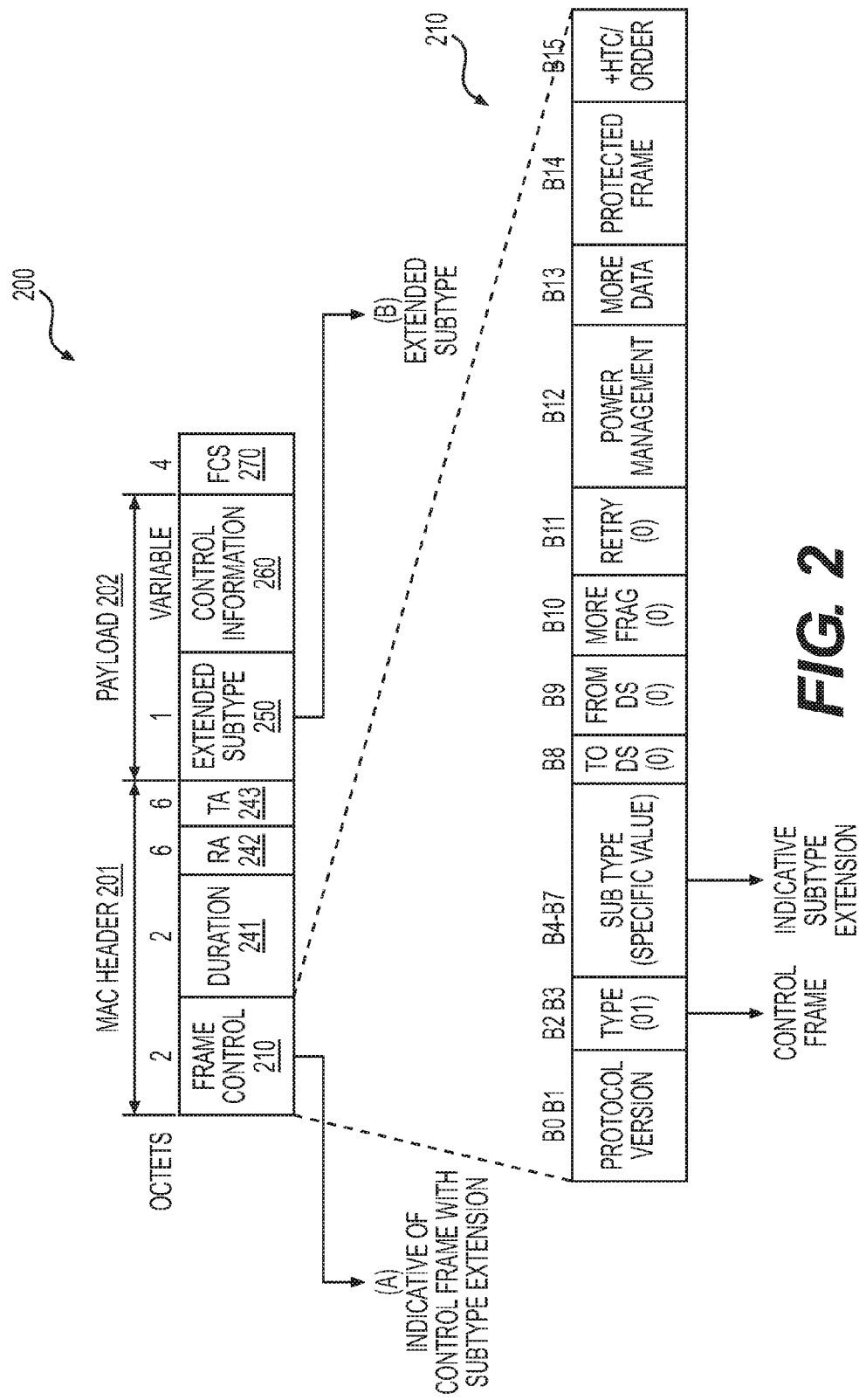
FIG. 2 shows an example of an extended control frame format according to an embodiment of the disclosure.

FIG. 2 shows a frame 200 in an extended control frame format with subtype extension according to an embodiment of the disclosure. In the FIG. 2 example, the frame 200 includes a MAC header 201, a payload 202 and a frame check sequence (FCS) 270. In the FIG. 2 example, the frame 200 is a control frame with an extended subtype, and the subtype of the control frame is indicated by an extended subtype field in the payload 202.

The MAC header 201 includes a frame control field 210, a duration field 241, a receiver address field 242, and a transmitter address field 243. In an example, the frame control field 210 occupies two octets (two bytes), the duration field 241 occupies two octets (two bytes), the receiver address (RA) field 242 occupies six octets (six bytes), and the transmitter address (TA) field 243 occupies six octets (six bytes), in the FIG. 2 example, the frame control field 210 indicates that the frame 200 is a control frame, and the frame control field 210 also indicates that the extended control frame format is used to indicate the extended subtype of the control frame. When the extended control frame format is used, the payload 202 includes an extended subtype field 250. In an example, the extended subtype field 250 occupies one octets. It is noted that the extended subtype field 250 can have other suitable length. In an example, the payload 202 also includes a control information field 260.

The frame control field 210 has 16 bits B0-B15, and the 16 bits form a plurality of fields that are subfields for the frame control field 210. For example, bits B0-B1 forms a protocol version field, bits B2-B3 forms a type field, B4-B7 form a subtype field, B8 forms a To DS field, B9 forms a From DS field, B10 forms a more frag field, B11 forms a retry field, B12 forms a power management field, B13 forms a more data field, B14 forms a protected frame field, and B15 forms an order field.

In an example, the type field is used to indicate the type for the frame 200. For example, when the type field has binary value "01", the frame 200 is a control frame; when the type field has binary value "00", the frame 200 is a management frame; when the type field has binary value "10", the frame 200 is a data frame.

Generally, the subtype field is used to indicate the subtype for the frame 200 when the frame is in the regular control frame format. For example, when the type field has binary value "01", and the subtype field has binary value "1101", the frame 200 is an ACK frame; when the type field has binary value "01"; and the subtype field has binary value "1011", the frame 200 is an RTS frame. In an embodiment, a value that is predefined as an indicator for the extended control frame format is filled in the subtype field to indicate the extended control frame format. In the example, the extended subtype field 250 has a value corresponding to the extended subtype of the control frame.

In the FIG. 2 example, when the type field has binary value "01", the bits B8-B11 have binary value "0000".

Figure 3:
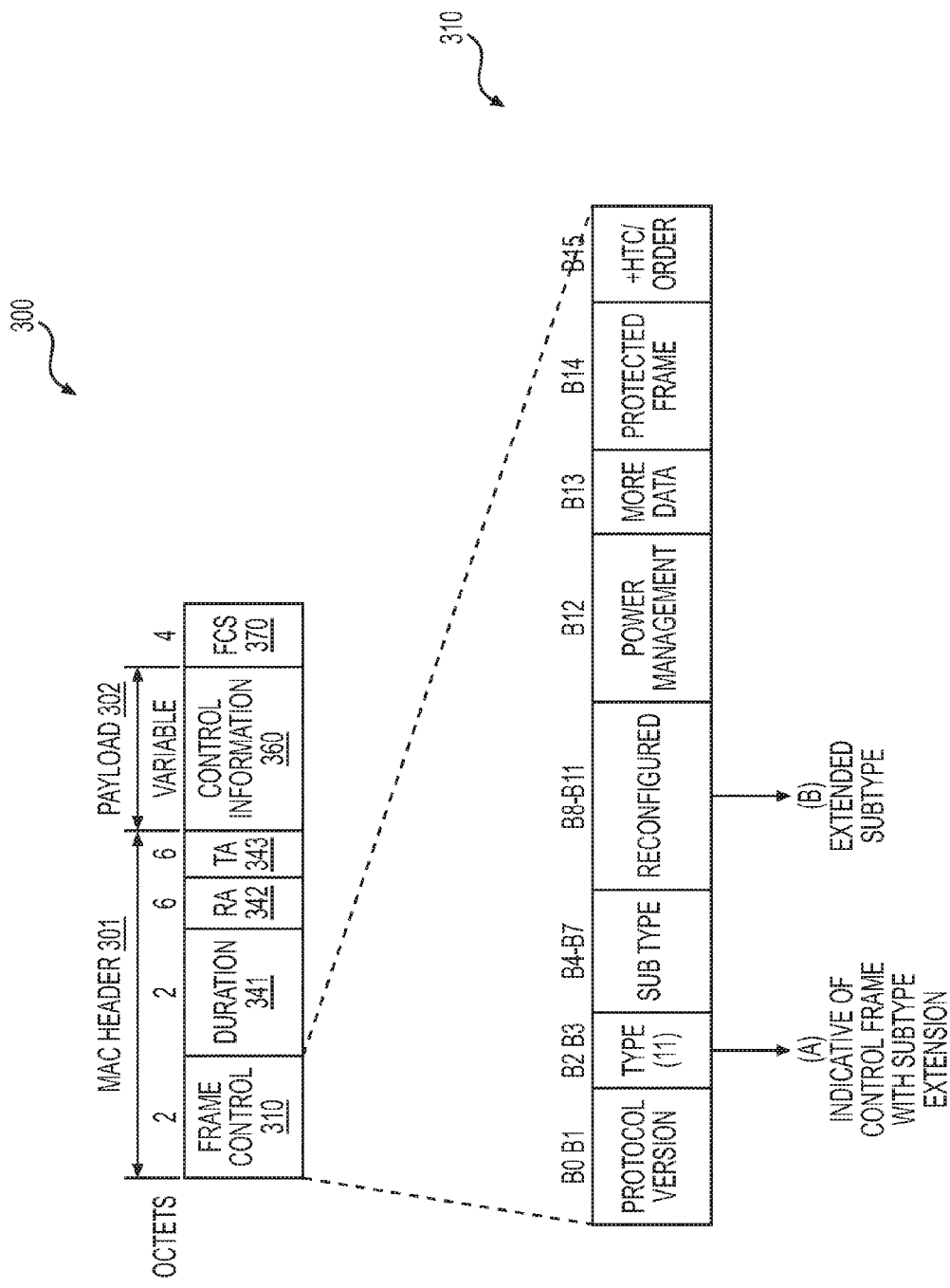
FIG. 3 shows an example of an extended control frame format according to an embodiment of the disclosure.

FIG. 3 shows a frame 300 in an extended control frame format with subtype extension according to an embodiment of the disclosure. In the FIG. 3 example, the frame 300 includes a MAC header 301, a payload 302 and a frame check sequence (FCS) 370. In the FIG. 3 example, the frame 300 is a control frame with a subtype that is an extended subtype, and the subtype of the control frame is indicated by a combination of an extension indicator and a reconfigured field in the MAC header 301.

The MAC header 301 includes a frame control field 310, a duration field 341, a receiver address field 342, and a transmitter address field 343. In an example, the frame control field 310 occupies two octets (two bytes), the duration field 341 occupies two octets (two bytes), the receiver address (RA) field 342 occupies six octets (six bytes), and the transmitter address (TA) field 343 occupies six octets (six bytes). In the FIG. 3 example, the frame control field 310 indicates that the frame 300 is a control frame in the extended control frame format with subtype extension, and the frame control field 310 includes a reconfigured field that is used to identify the extended subtype.

Similar to the frame control field 210 in the FIG. 2 example, the frame control field 310 has 16 bits B0-B15, and the 16 bits form a plurality of fields. The bits B0-B1 forms a protocol version field; bits B2-B3 forms a type field; B4-B7 forms a subtype field; B12 forms a power management field, B13 forms a more data field, B14 forms a protected frame field, and B15 forms an order field. In the FIG. 3 example, when the type field has binary value "11", B8-B11 are reconfigured to form an extended subtype field that carries a value that is predefined to indicate the extended subtype. In another embodiment, the bits B12 to B15 can be redefined as other subfields.

Figure 4:
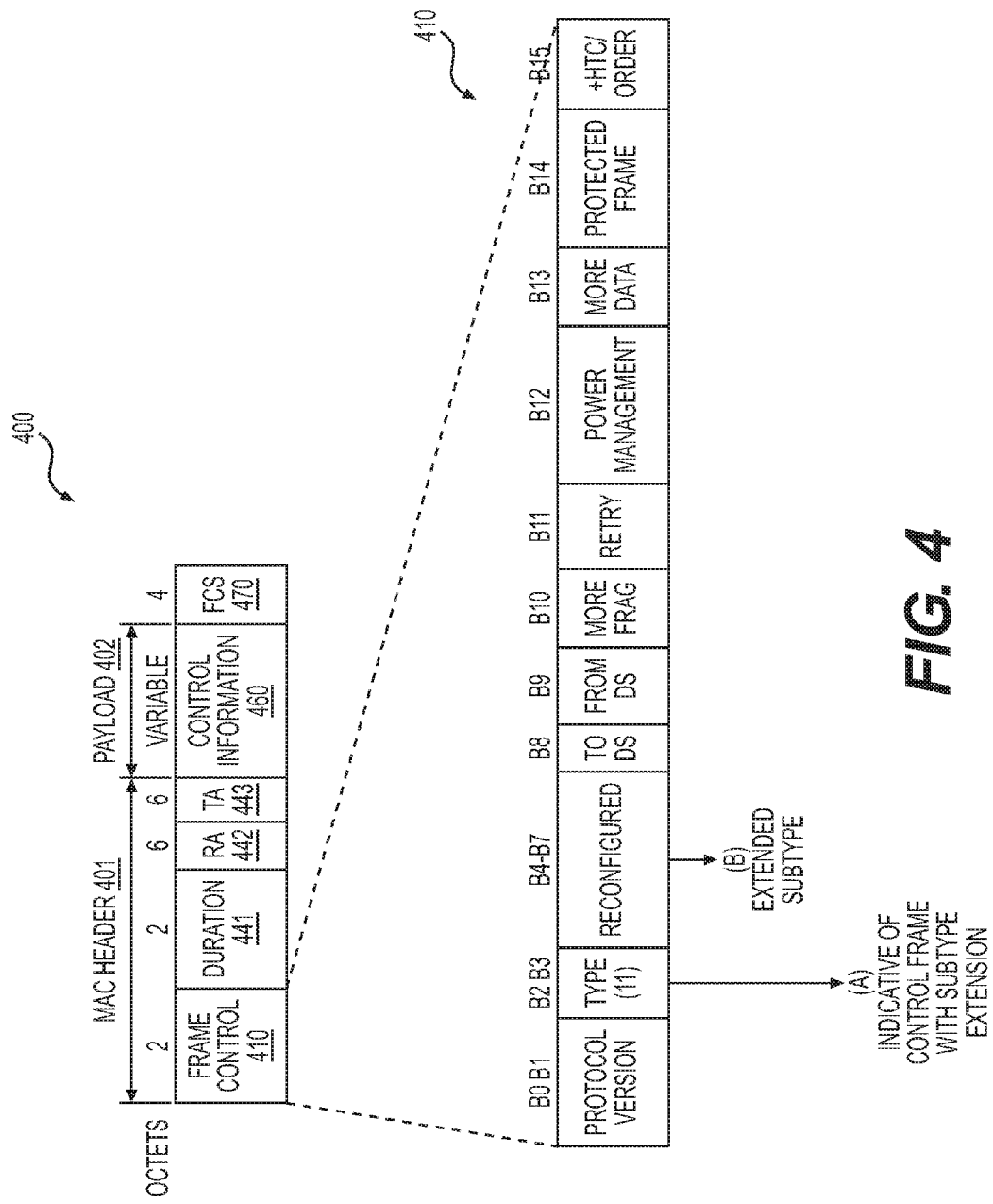
FIG. 4 shows an example of an extended control frame format according to an embodiment of the disclosure.

FIG. 4 shows a frame 400 in an extended control frame format with subtype extension according to an embodiment of the disclosure. In the FIG. 4 example, the frame 400 includes a MAC header 401, a payload 402 and a frame check sequence (FCS) 470. In the FIG. 4 example, the frame 400 is a control frame with a subtype that is an extended subtype, and the subtype of the control frame is indicated by a combination of an extension indicator and a reconfigured field in the MAC header 401.

The MAC header 401 includes a frame control field 410, a duration field 441, a receiver address field 442, and a transmitter address field 443. In an example, the frame control field 410 occupies two octets (two bytes), the duration field 441 occupies two octets (two bytes), the receiver address (RA) field 442 occupies six octets (six bytes), and the transmitter address (TA) field 443 occupies six octets (six bytes). In the FIG. 4 example, the frame control field 410 indicates that the frame 400 is a control frame in the extended control frame format with subtype extension, and the frame control field 410 includes a reconfigured field that is used to identify the extended subtype.

Similar to the frame control field 210 in the FIG. 2 example, the frame control field 410 has 16 bits B0-B15, and the 16 bits form a plurality of fields that are subfields of the frame control field 410. The bits B0-B1 form a protocol version field, bits B2-B3 form a type field, B4-B7 form a subtype field, B8 forms a To DS field, B9 forms a From DS field, B10 forms a more frag field, B11 forms a retry field, B12 forms a power management field, B13 forms a more data field, B14 forms a protected frame field, and B15 forms an order field. In the FIG. 4 example, when the type field has binary value "11", B4-B7 are reconfigured to be the extended subtype field that carries a value that is predefined to indicate the extended subtype.

Figure 5:
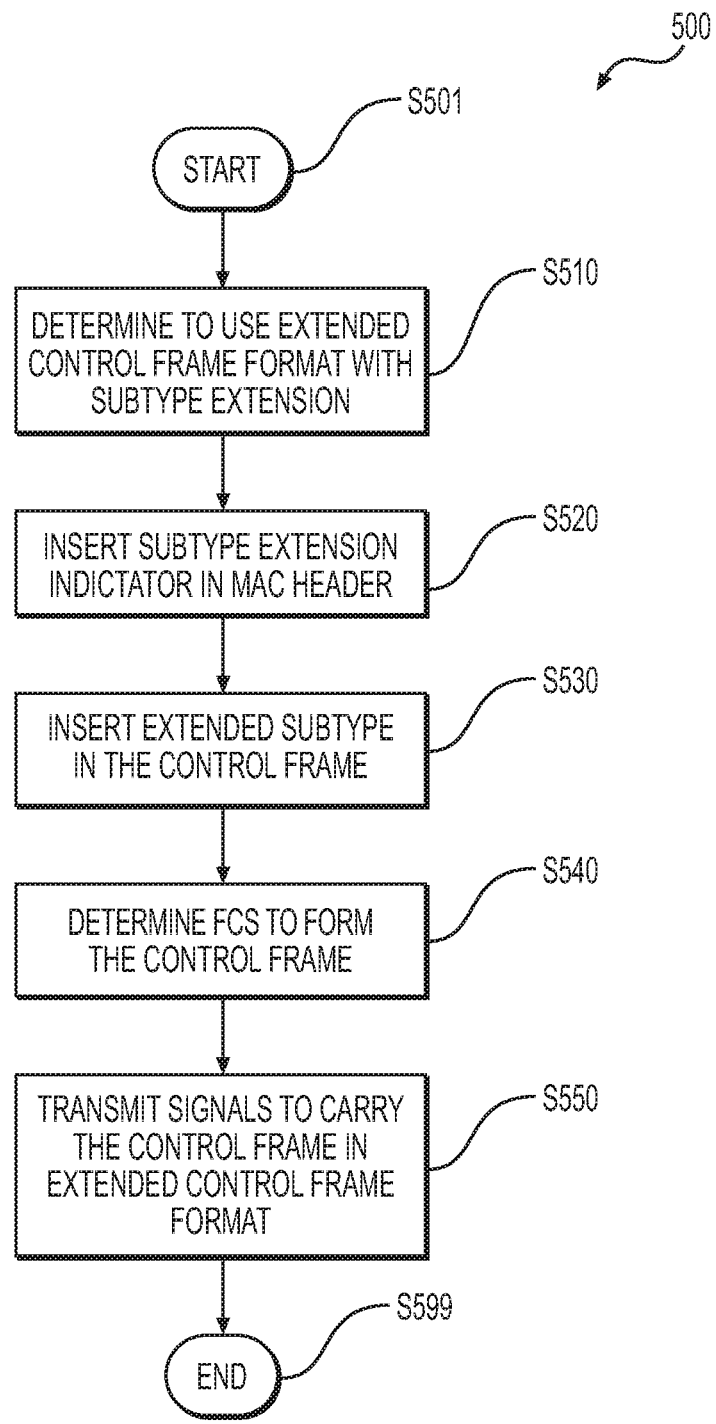
FIG. 5 shows a flow chart outlining a process example 500 according to an embodiment of the disclosure.

FIG. 5 shows a flow chart outlining a process example 500 according to an embodiment of the disclosure. In an example, the process is executed by a processing circuit, such as the processing circuit 120 in the FIG. 1 example. The process starts at S501 and proceeds to S510.

At S510, a usage of an extended control frame format is determined. In an example, the first electronic device 110 and the second electronic device 160 are configured to use control frames in the extended subtype to facilitate in data exchange. At a time, the first electronic device 110 decides to generate and send a control frame in the extended subtype to the second electronic device 160. Then the processing circuit 120 determines to use the extended control frame format.

At S520, a subtype extension indicator is inserted in the MAC header. In an embodiment, the processing circuit 120 fills in the type field with binary value "01" to indicate the control type, and fills in the binary value "0110" in the subtype field within the MAC header of the control frame to indicate an extended control frame format that uses an extended subtype field outside of the MAC header. In another embodiment, the processing circuit 120 fills in the type field with binary value "11" that is specifically defined to indicate a control type with an extended control frame format that uses a reconfigured field in the MAC header as the extended subtype field.

At S530, a value corresponding to the extended subtype is inserted in the control frame according to the extended control frame format. In an embodiment, the extended control frame format uses an extended subtype field outside of the MAC header, thus the processing circuit 120 includes an extended subtype field in the payload of the control frame, and fills a value corresponding to the extended subtype of the control frame in the extended subtype field. In another embodiment, the extended control frame format uses a re-configured field in the MAC header as the extended subtype field, and the processing circuit 120 fills in the reconfigured field with a value corresponding to the extended subtype.

At S540, the control frame is finalized. In an example, the processing circuit 120 fills values in other fields of the MAC header and the payload, determines and fills in the FCS.

At S550, wireless signals that carry the control frame are transmitted. Then the process proceeds to S599 and terminates.

Figure 6:
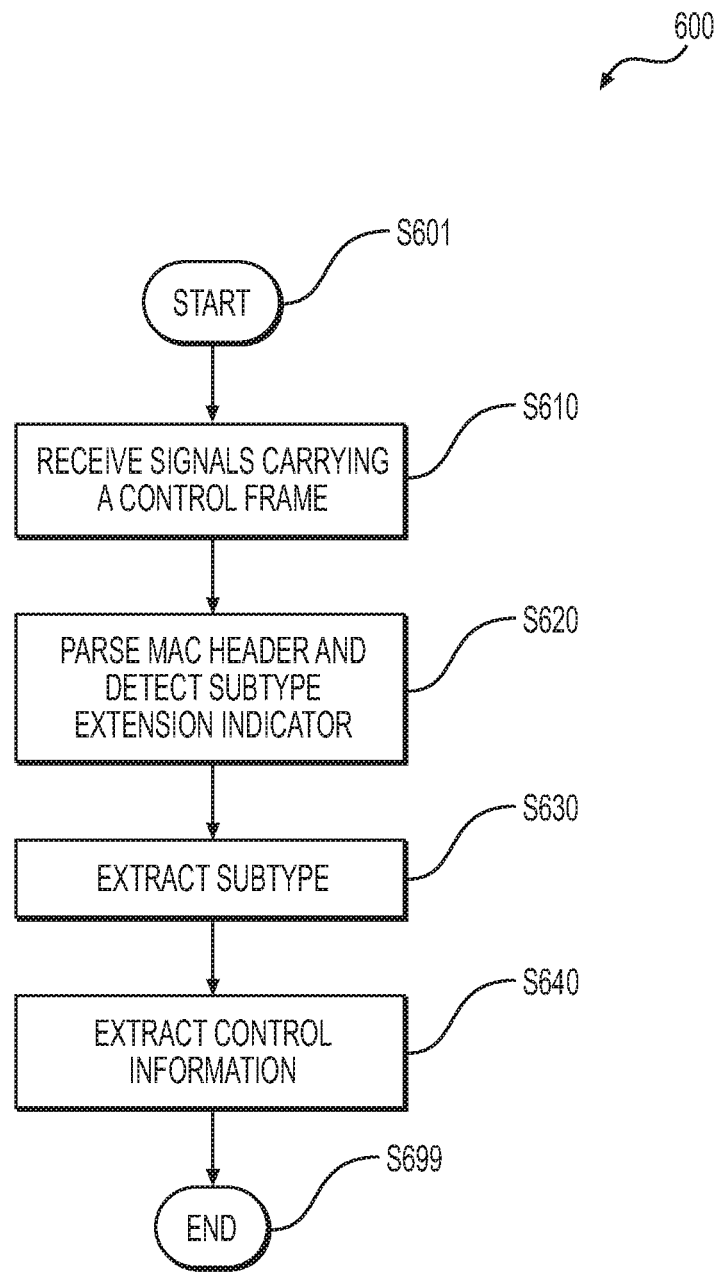
FIG. 6 shows a flow chart outlining a process example 600 according to an embodiment of the disclosure.

FIG. 6 shows a flow chart outlining a process example 600 according to an embodiment of the disclosure. In an example, the process is executed by a processing circuit, such as the processing circuit 170 in the FIG. 1 example. The process starts at S601 and proceeds to S610.

At S610, wireless signals that carry a frame are received. In an example, the receiving circuit 166 is configured to generate electrical signals in response to captured electromagnetic waves by the antenna 164, process the electrical signals to extract a frame from the electrical signals and provide the frame to the processing circuit 170.

At S620, the frame is parsed, and a subtype extension indicator is detected. In an embodiment, the processing circuit 170 detects that the type field in the MAC header of the frame has binary value "01", and the subtype field in the MAC header has binary value "0110". Based on the type field and the subtype field, the processing circuit 170 determines that the frame is a control frame in an extended control frame format that uses a specific field outside of the MAC header as the extended subtype field.

In another embodiment, the processing circuit 170 detects that the type field in the MAC header has binary value "11". Based on the type field, the processing circuit 170 determines that the frame is a control frame in an extended control frame format that uses a reconfigured field in the MAC header as the extended subtype field.

At S630, the extended subtype is extracted. In an embodiment, a specific field outside of the MAC header is used as the extended subtype field, and then the processing circuit 170 extracts the value in the extended subtype field according to the extended control frame format to determine the extended subtype. In another embodiment, a reconfigured field in the MAC header is used as the extended subtype field, the processing circuit 170 then extracts the value in the reconfigured field according to the extended control frame format to determine the extended subtype.

At S640, control information is extracted. Then the process proceeds to S699 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
   a processing circuit that generates a frame including a media access control (MAC) header, wherein the MAC header includes at least (1) a type field indicating a control frame format, (2) a subtype field indicating an extended control frame format, (3) a To Distributed System (DS) field, (4) a From DS field, (5) More Fragments (MF) field indicating whether a packet is divided into multiple frames, and (6) Retry field indicating whether the frame is resent;
   the processing circuit determines to reuse the To DS, From DS, More Fragments, and Retry fields together as an extended subtype field according to the extended control frame format to carry an identification for an extended subtype of the frame, instead of defining another extended subtype field outside of the MAC header; and
   a transceiver configured that transmits signals to carry the frame.

2. The apparatus of claim 1, wherein the processing circuit fills in the subtype field in the frame with a value that is predefined to indicate the extended control frame format.

3. The apparatus of claim 2, wherein the processing circuit configures a field outside of the MAC header to be the extended subtype field.

4. The apparatus of claim 1, wherein the processing circuit fills in a type field in the MAC header of the frame with a specific value that is predefined to indicate a control type, and the extended control frame format.

5. The apparatus of claim 4, wherein the processing circuit configures the subtype field to be the extended subtype field based on the type field.

6. A method for wireless communication, comprising:
   generating a frame including a media access control (MAC) header, wherein the MAC header includes at least (1) a type field indicating a control frame format, (2) a subtype field indicating an extended control frame format, (3) a To Distributed System (DS) field, (4) a From DS field, (5) More Fragments (MF) field indicating whether a packet is divided into multiple frames, and (6) Retry field indicating whether the frame is resent;
   the processing circuit determining to reuse the To DS, From DS, More Fragments, and Retry fields together as an extended subtype field according to the extended control frame format to carry an identification for an extended subtype of the frame, instead of defining another extended subtype field outside of the MAC header; and transmitting, by a transmitting circuit, signals to carry the frame.

7. The method of claim 6, further comprising:

filling in the subtype field in the frame with a value that is predefined to indicate the extended control frame format.

8. The method of claim 7, further comprising:

configuring a field outside of the MAC header to be the extended subtype field.

9. The method of claim 6, further comprising:

filling in a type field in the MAC header of the frame with a specific value that is predefined to indicate a control type, and the extended control frame format.

10. The method of claim 9, further comprising:

configuring the subtype field to be the extended subtype field based on the type field.

11. An apparatus, comprising:

a transceiver that receives wireless signals, and generates a frame in response to the wireless signals; and a processing circuit that parses the frame, detects the frame including a media access control (MAC) header, wherein the MAC header includes at least (1) a type field indicating a control frame format, (2) a subtype field indicating an extended control frame format, (3) a To Distributed System (DS) field, (4) a From DS field, (5) More Fragments (MF) field indicating whether a packet is divided into multiple frames, and (6) Retry field indicating whether the frame is resent, and the To DS, From DS, More Fragments, and Retry fields together determined as being reused as an extended subtype field according to the extended control frame format to carry an identification for an extended subtype of the frame, instead of another extended subtype field being defined outside of the MAC header.

12. The apparatus of claim 11, wherein the processing circuit determines that a value in the subtype field is indicative of the extended control frame format.

13. The apparatus of claim 12, wherein the processing circuit extracts the extended subtype from a field outside of the MAC header.

14. The apparatus of claim 11, wherein the processing circuit determines that a value in a type field is indicative of a control type, and the extended control frame format.

15. The apparatus of claim 14, wherein the processing circuit determines the extended subtype based on the value in the type field and a specific value in the subtype field.

16. A method of wireless communication, comprising:

generating a frame in response to wireless signals;

detecting the frame including a media access control (MAC) header, wherein the MAC header includes at least (1) a type field indicating a control frame format, (2) a subtype field indicating an extended control frame format, (3) a To Distributed System (DS) field, (4) a From DS field, (5) More Fragments (MF) field indicating whether a packet is divided into multiple frames, and (6) Retry field indicating whether the frame is resent;

determining the To DS, From DS, More Fragments, and Retry fields together as being reused as an extended subtype field according to the extended control frame format to carry an identification for an extended subtype of the frame, instead of another extended subtype field being defined outside of the MAC header; and extracting the identification for the extended subtype from the extended subtype field according to the extended control frame format.

17. The method of claim 16, further comprising:

determining that a value in the subtype field is indicative of the extended control frame format.

* * * * *